United States Patent
Lee et al.

(10) Patent No.: US 10,935,726 B1
(45) Date of Patent: Mar. 2, 2021

(54) INTEGRATED BROADBAND OPTICAL COUPLERS WITH ROBUSTNESS TO MANUFACTURING VARIATION

(71) Applicant: Cisco Technology, Inc., San Jose, CA (US)

(72) Inventors: Yi Ho Lee, Breinigsville, PA (US); Tao Ling, Breinigsville, PA (US); Ravi S. Tummidi, Breinigsville, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/593,821

(22) Filed: Oct. 4, 2019

(51) Int. Cl.
*G02B 6/28* (2006.01)
*H04B 10/25* (2013.01)
*H04J 14/02* (2006.01)

(52) U.S. Cl.
CPC ..... *G02B 6/2821* (2013.01); *H04B 10/25891* (2020.05); *H04J 14/02* (2013.01)

(58) Field of Classification Search
CPC .................. G02B 6/2821; H04B 10/25891
See application file for complete search history.

(56) References Cited

U.S. PATENT DOCUMENTS

| 5,502,781 | A  | * | 3/1996 | Li ...................... G01R 33/0327 385/132 |
| 6,763,155 | B2 |   | 7/2004 | Park et al. |
| 7,272,279 | B2 | * | 9/2007 | Ishikawa ................. G02B 6/125 385/39 |
| 2003/0118279 | A1 | * | 6/2003 | Izhaki ..................... G02B 6/125 385/21 |
| 2004/0151423 | A1 | * | 8/2004 | Izhaky .................. G02B 6/1228 385/21 |
| 2011/0129236 | A1 |   | 6/2011 | Jeong |
| 2017/0285267 | A1 |   | 10/2017 | Kato et al. |

OTHER PUBLICATIONS

K. Jinguji et al., "Mach-Zehnder Interferometer Type Wavelength-Flattened Coupling Optical Waveguide Coupler With Ratio," Electronics Letter, 26, 1326 (1990).
M. A. Tran, C. Zhang and J. E. Bowers, "A broadband optical switch based on adiabatic couplers," 2016 IEEE Photonics Conference (IPC), Waikoloa, HI, 2016, pp. 755-756.
PCT Notification of Transmittal of the International Search Report and the Written Opinion of the International Searching Authority, or the Declaration for Application No. PCT/US2020/052606 dated Nov. 27, 2020.

* cited by examiner

*Primary Examiner* — Sung H Pak
(74) *Attorney, Agent, or Firm* — Patterson + Sheridan, LLP (57) ABSTRACT

An optical device is disclosed, including a phase delay, a first adiabatic coupler adapted to receive an input signal and adapted to be optically coupled to an input of the phase delay, and a second adiabatic coupler adapted to be optically coupled to an output of the phase delay. The second adiabatic coupler includes a first waveguide including a first portion optically coupled to the first output and including a first width, and a second waveguide including a second portion optically coupled to the second output and comprising a second width that is approximately equal to the first width.

17 Claims, 9 Drawing Sheets

INTEGRATED BROADBAND OPTICAL COUPLERS WITH ROBUSTNESS TO MANUFACTURING VARIATION

TECHNICAL FIELD

Embodiments presented in this disclosure generally relate to fiber optic communications. More specifically, though not exclusively, embodiments disclosed herein relate to a broadband tap coupler.

BACKGROUND

In fiber-optic communications (e.g., a broadband fiber optic communication system), wavelength-division multiplexing (WDM) can be used to multiplex multiple optical carrier signals onto an optical fiber. WDM uses different wavelengths of light to facilitate data communication over a fiber (e.g., transmitting data from a data source to a data recipient). A WDM system commonly uses a multiplexer at the transmitter to join several signals together, and a demultiplexer at the receiver to split them apart.

In many telecom and data communication applications (e.g., coarse WDM in the O-band or dense WDM in the C-band), WDM uses an optical device referred to as a broadband tap coupler as a building block for optical signal routing and processing. As one example, some frameworks (e.g., 400G-FR4) use a lattice filter for de-multiplexing. A lattice filter, in general, relies on cascaded Mach-Zehnder Interferometers (MZI) with broadband tap couplers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments disclosed herein include an optical device. The optical device includes a phase delay, a first adiabatic coupler adapted to receive an input signal and adapted to be optically coupled to an input of the phase delay, and a second adiabatic coupler adapted to be optically coupled to an output of the phase delay. The second adiabatic coupler includes a first output and a second output. The second adiabatic coupler further includes a first waveguide including a first portion optically coupled to the first output and including a first width, and a second waveguide including a second portion optically coupled to the second output and comprising a second width that is approximately equal to the first width.

Embodiments further include an adiabatic coupler, including a first output and a second output. The adiabatic coupler further includes a first waveguide including a first portion optically coupled to a first output and a second portion adapted to be optically coupled to a phase delay. The adiabatic coupler further includes a second waveguide including a third portion optically coupled to a second output and a fourth portion adapted to be optically coupled to an output of another adiabatic coupler, wherein the first portion comprises a first width and the third portion comprises a second width approximately equal to the first width.

Embodiments further include a fiber optic communication system, including a data source, a multiplexer, a demultiplexer, and a tap coupler. The tap coupler includes a phase delay, a first adiabatic coupler adapted to receive an input signal and adapted to be optically coupled to an input of the phase delay, and a second adiabatic coupler adapted to be optically coupled to an output of the phase delay. The second adiabatic coupler includes a first output and a second output. The second adiabatic coupler further includes a first waveguide including a first portion optically coupled to the first output and including a first width, and a second waveguide including a second portion optically coupled to the second output and including a second width that is approximately equal to the first width.

EXAMPLE EMBODIMENTS

A tap coupler is an optical device that can be used in a fiber optic communication system. In general, a tap coupler intended for high bandwidth usage should be insensitive to a wide range of wavelengths across different communication bands. That is, the tap coupler should distribute the input signal across the desired outputs, in the desired fashion, regardless of the wavelengths included in the input signal. This allows the tap coupler to be used in a fiber optic communication that uses a large number of wavelength channels, facilitating higher data bandwidth. Further, a tap coupler may generate a phase difference between outputs. It can also be important that this phase difference is constant to allow for reliable operation in a high bandwidth environment.

In some circumstances, thickness variation during manufacturing can change the output phase difference of the tap coupler, harming reliability. In other circumstances, thickness variation during manufacturing can create cross-talk between communication channels, also harming reliability. This can be particularly problematic in integrated CMOS-based silicon photonics in a high bandwidth environment. For example, in high bandwidth environments broadband tap couplers must comply with stringent cross-talk requirements (e.g., 25 dB in 400G-FR4). A slight process variation during manufacturing can mean that a tap coupler does not comply with these cross-talk requirements.

It is, therefore, beneficial when the tap coupler is both robust to manufacturing variation in terms of bandwidth, by reducing (or eliminating) cross-talk across channels, and robust to manufacturing variation in terms of phase difference, by generating a constant phase difference. One more techniques disclosed herein relate to a broadband tap coupler which is robust to manufacturing variation in terms of both bandwidth and phase difference between output signals.

Figure 1A:
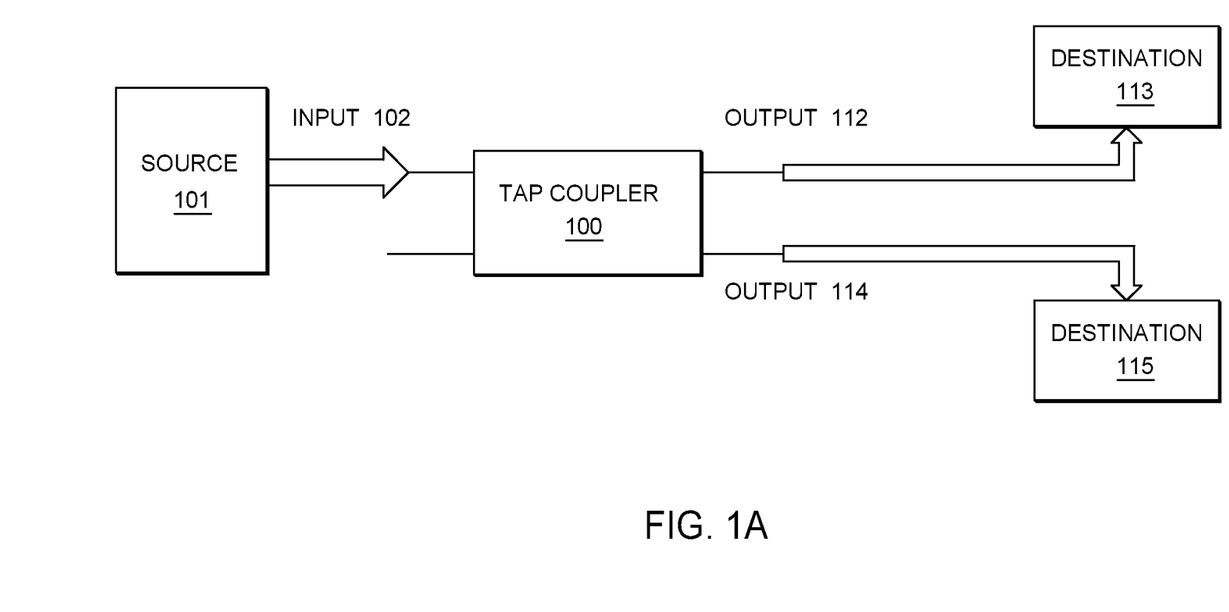
FIGS. 1A-1C are block diagrams illustrating a broadband tap coupler, according to one embodiment described herein.
Figure 1B:
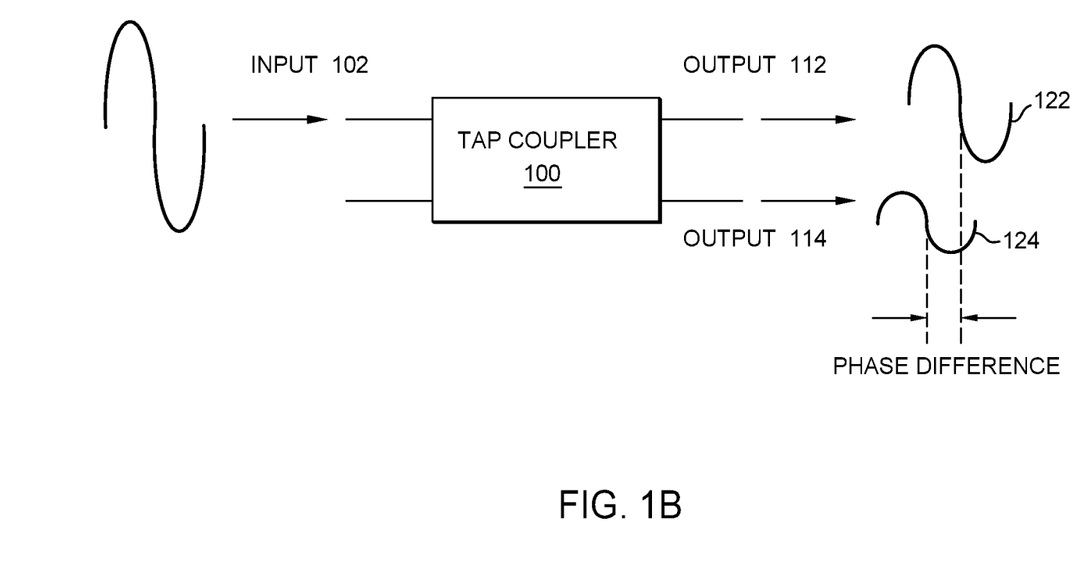
Figure 1C:
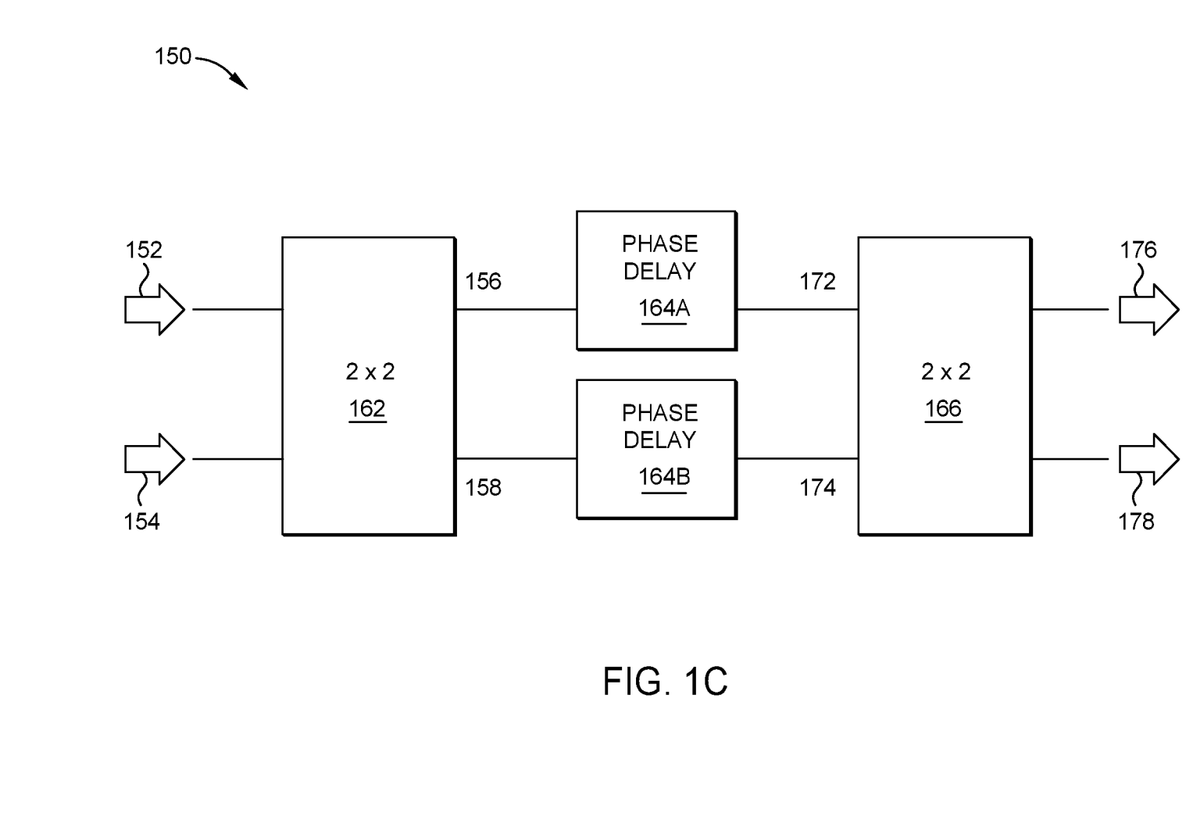

FIGS. 1A-1C are block diagrams illustrating a broadband tap coupler, according to one embodiment described herein. FIG. 1A is a block diagram illustrating a tap coupler 100, according to on embodiment described herein. A tap coupler, in an embodiment, may be used to distribute power between an optical input signal (e.g., laser light) and optical output signals, generating potentially different power distributions between optical output signals.

As illustrated in FIG. 1A, the tap coupler 100 receives an input signal 102 from a source 101 and outputs two output signals 112 and 114. In general, an optical coupler can be used to couple light from one (or several) inputs to one (or several) outputs. As illustrated in FIG. 1A, the tap coupler 100 distributes light received as the input signal 102 to the output signals 112 and 114. This is merely one example, and any suitable number of inputs and outputs can be used.

The output signal 112 is sent to a destination 113. The output signal 114 is sent to a destination 115. In an embodiment, the input signal 102 can be distributed evenly, or unevenly, among the output signals 112 and 114. As an example of uneven distribution, the output signal 112 can represent 10% of the power of the input signal 102, while the output signal 114 represents 90% of the power of the input signal 102. Alternatively, as an example of even distribution, the output signals 112 and 114 can each represent 50% of the power of the input signal 102. This distribution of the signal across output ports can be achieved in numerous ways. For example, as illustrated in FIGS. 1B-C, below, a Mach-Zehnder Interferometer (MZI) can be used to distribute the signal.

FIG. 1B is a block diagram further illustrating the tap coupler 100, according to on embodiment described herein. In particular, FIG. 1B illustrates an MZI based tap coupler 100 which creates a phase difference between output signals with phases 122 and 124. That is, the tap coupler 100 illustrated in FIG. 1B receives an input signal 102 and outputs two output signals 112 and 114, just as illustrated in FIG. 1A. Again, the input signal 102 can be distributed evenly, or unevenly, among the output signals 112 and 114. Further, the input signal 102 and the output signals 112 and 114 carry the same channels and the same data.

As illustrated in FIG. 1B, however, the tap coupler 100 uses an MZI to distribute the input signal 102 between the output signals 112 and 114. This generates a phase difference between the output signals 112 and 114. For example, the output signal 112 includes a phase 122, which is different from the phase 124 for the output signal 114.

FIG. 1C is a further block diagram illustrating a tap coupler configuration 150, according to on embodiment described herein. In an embodiment, the tap coupler configuration 150 is again a Mach-Zehnder Interferometer (MZI) based tap coupler. The tap coupler configuration 150 includes a first 2×2 coupler 162, phase delays 164A-B, and a second 2×2 coupler 166. The 2×2 couplers 162 and 166 can each couple two inputs to two outputs. For example, the 2×2 coupler 162 couples the input signals 152 and 154 to the output signals 156 and 158. The 2×2 coupler 166 couples the input signals 172 and 174 to the output signals 176 and 178.

In an embodiment, an input signal 152 passes through the first 2×2 coupler 162 and one (or both) of the phase delays 164A-B. The phase delays 164A-B act to shift the phase of the output signals 156 and 158 before entering the 2×2 coupler 166, as is known for MZI based tap couplers. The 2×2 coupler 166 generates the output signals 176 and 178. In an embodiment, the tap coupler configuration 150 divides the input signal 152 into output signals 176 and 178. The output signals 176 and 178 can be divided equally, or unequally.

Figure 7:
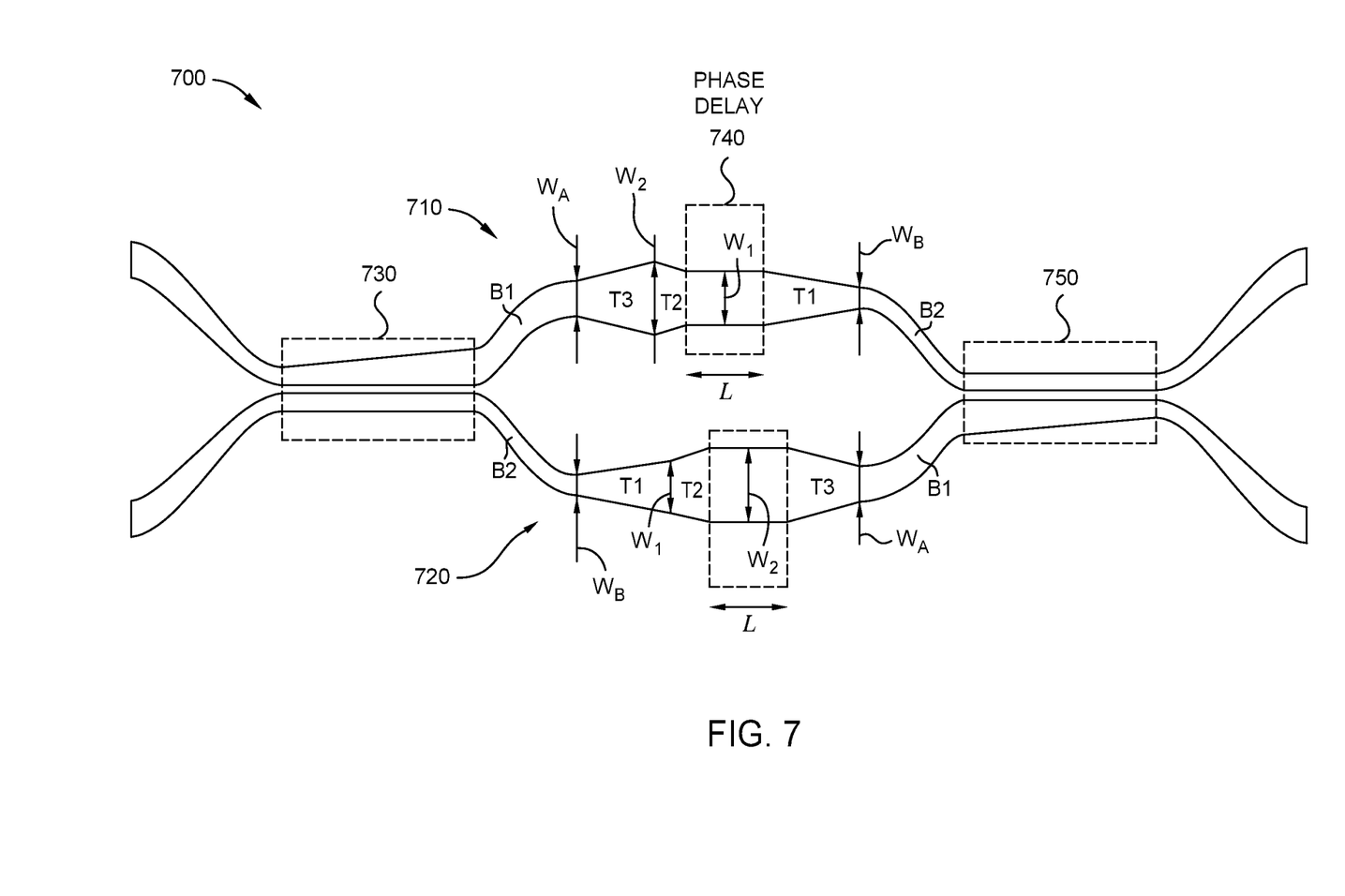
FIG. 7 illustrates a top down view of a structure for a tap coupler device, according to one embodiment described herein.

The 2×2 couplers 162 and 166 can be any suitable 2×2 coupler. For example, the 2×2 couplers illustrated in FIGS. 2-4 may be used. Further, the phase delays 164A-B can be any suitable phase delay element (e.g., any phase shifter suitable for existing MZI based tap couplers). FIG. 7, discussed below, describes one example phase delay structure suitable for use as the phase delays 164A-B.

Figure 2:
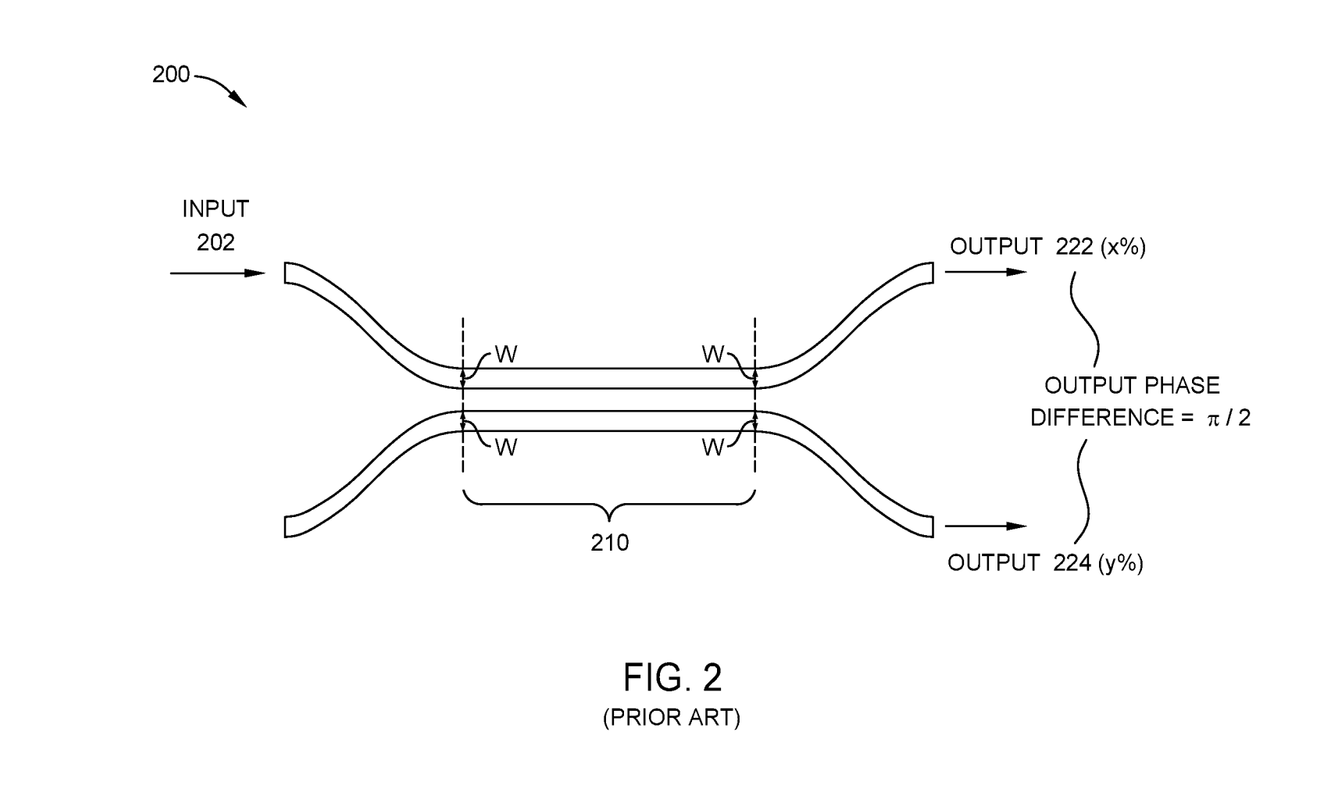
FIG. 2 illustrates a prior art tap coupler, according to one embodiment described herein.

FIG. 2 illustrates a prior art tap coupler 200, according to one embodiment described herein. The tap coupler 200 illustrates a known 2×2 tap coupler configuration which is robust to manufacturing variance in terms of phase difference between output signals, but which is not robust to manufacturing variance in terms of bandwidth.

In an embodiment, the tap coupler 200 includes waveguides 210, each of which has approximately the same width w. An input signal 202 is provided to the tap coupler 200. The input signal passes through the waveguides 210, generating output signals 222 and 224. In an embodiment, the output signal 222 represents x % of the power of the input signal 202, while the output signal 224 represents y % of the power of the input signal 202. That is, the output power of the output signals 222 and 224 is not limited to 50/50.

The configuration of the tap coupler 200 is robust to manufacturing variation in terms of phase difference: it generates output signals with a constant phase difference, regardless of minor variations in silicon thickness (e.g., as a result of manufacturing variance when forming the device). In particular, because the waveguides 210 have approximately the same width, the output signals 222 and 224 have a constant phase difference of $\pi/2$ regardless of minor variations in thickness.

But the tap coupler 200 is not robust to manufacturing variation in terms of bandwidth: its treatment of various communication channels is not robust to thickness variation. As discussed above, modern broadband fiber optic communication systems must be able to meet broad bandwidth requirements. Manufacturing variances (e.g., variations in silicon thickness during manufacturing) in the tap coupler 200 can generate cross-talk across difference communication channels, harming reliability and potentially violating cross-talk and bandwidth requirements.

Figure 3:
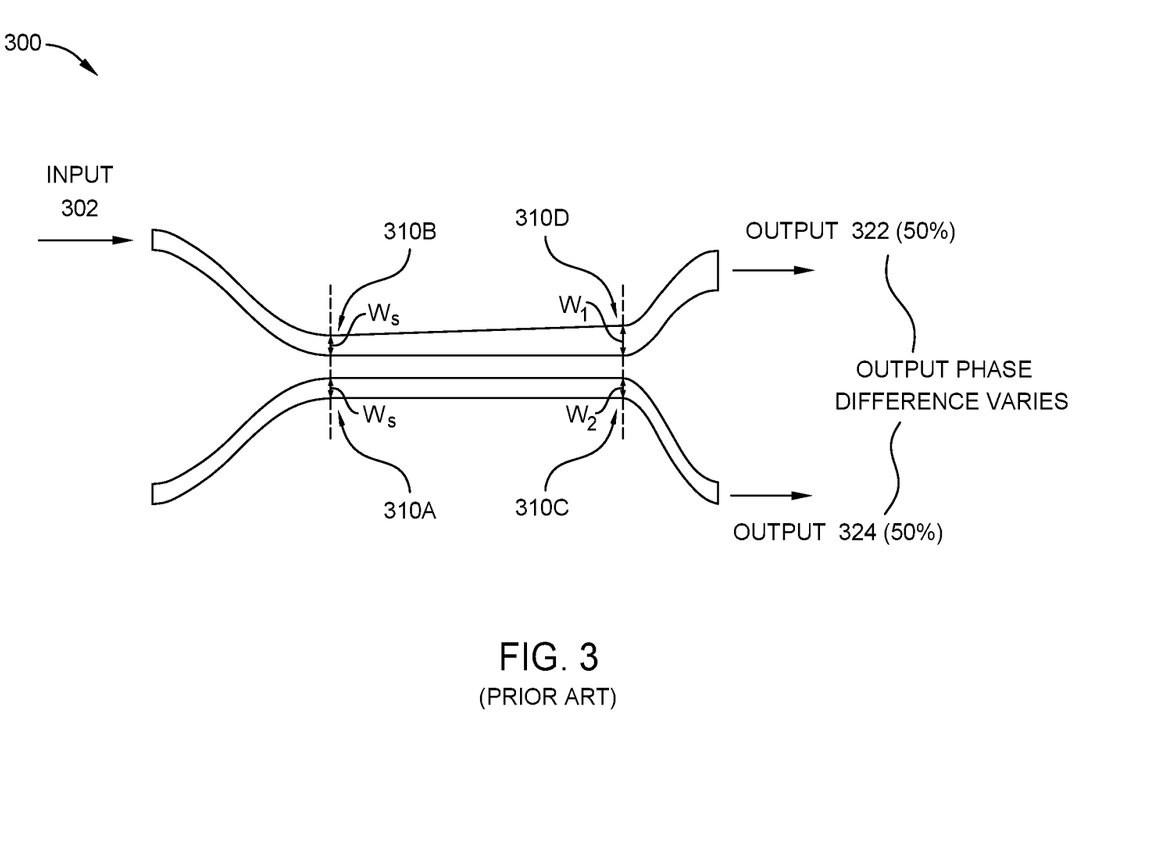
FIG. 3 illustrates a prior art adiabatic coupler, according to one embodiment described herein.

FIG. 3 illustrates a prior art adiabatic coupler 300, according to one embodiment described herein. In an embodiment, the adiabatic coupler 300 is a known configuration for a 50/50 coupler, meaning that it divides the input signal evenly between two outputs. Further, the adiabatic coupler 300 is robust to manufacturing variation in terms of bandwidth, but not in terms of phase difference between the output signals.

The adiabatic coupler 300 includes waveguide portions 310A-D. In an embodiment, these four waveguide portions do not have equal width. For example, as illustrated in FIG. 3, the waveguide portions 310A and 310B each have approximately the same width relative to each other: $w_s$. The waveguide portions 310C and 310D do not have the same width relative to each other. The waveguide portion 310C has a width $w_2$ and the waveguide portion 310D has a width $w_1$, where $w_1$ and $w_2$ are different widths.

In an embodiment, an input signal 302 enters the adiabatic coupler and passes through the waveguide portions 310A-D. This generates output signals 322 and 324. The output signals 322 and 324 represent an approximately equal division of the power of the input signal 302. As discussed above, this configuration is robust to manufacturing variation in terms of bandwidth. That is, the adiabatic coupler 300 divides the input signal 302 approximately equally across a broad spectrum of communication channels, regardless of minor manufacturing variances (e.g., to variation in silicon thickness).

The adiabatic coupler 300 is not, however, robust to manufacturing variation in terms of phase difference. The phase difference between the output signal 322 and the output signal 324 varies based on numerous factors, including the widths of the waveguide portions 310C and 310D, the gap between the waveguide portions 310C and 310D, and other factors. Because of this, manufacturing variance that changes these factors (e.g., variations in silicon thickness) change the phase difference between the output signals 322 and 324.

Figure 4:
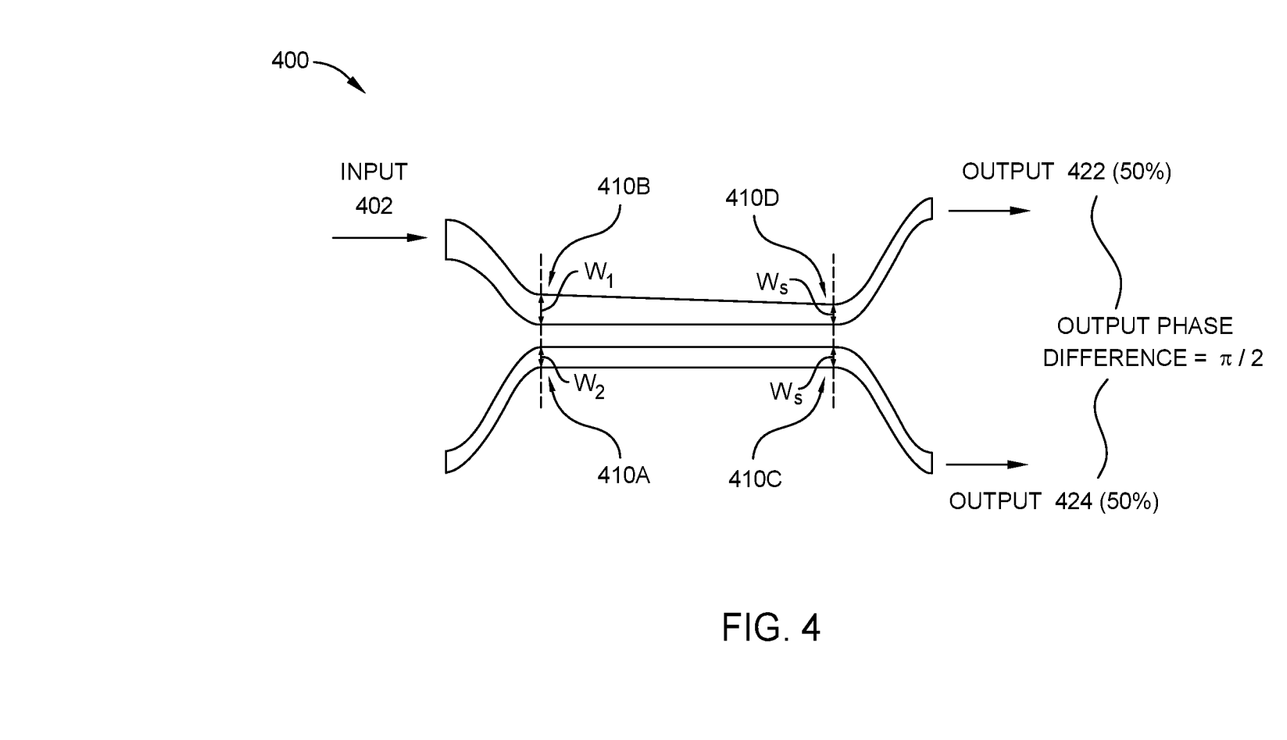
FIG. 4 illustrates a further adiabatic coupler, according to one embodiment described herein.

FIG. 4 illustrates a further adiabatic coupler 400, according to one embodiment described herein. In an embodiment, the adiabatic coupler 400 is also a 50/50 coupler, meaning that it divides the input signal evenly between two outputs. The adiabatic coupler 400, however, is robust to manufacturing variation in terms of both bandwidth and phase difference between the output signals.

The adiabatic coupler 400 includes waveguide portions 410A-D. Here, these four waveguide portions 410A-D do not have equal widths. For example, as illustrated in FIG. 4, the waveguide portions 410C and 410D each have approximately the same width relative to each other, $w_s$, but the waveguide portions 410A and 410B do not have the same width relative to each other. The waveguide portion 410A has a width $w_2$ and the waveguide portion 410B has a width $w_1$, where $w_1$ and $w_2$ are different widths.

In operation, an input signal 402 enters the adiabatic coupler and passes through the waveguide portions 410A-D. This generates output signals 422 and 424. In an embodiment, the output signals 422 and 424 represent an approximately equal division of the input signal 402. Further, the adiabatic coupler 400 is robust to manufacturing variation (e.g., variation in thickness) across bandwidths. The output signals 422 and 424 represent an approximately equal division of the power of the input signal 402 across a broad spectrum of communication channels.

The adiabatic coupler 400 is also robust to manufacturing variation in terms of phase difference between output signals. This is because, in the adiabatic coupler 400, the unequal width waveguide portions 410A and 410B are on the input side of the coupler and the equal width waveguide portions 410C and 410D are on the output side of the coupler. This arrangement is different from the adiabatic coupler 300, illustrated in FIG. 3, in which the equal width waveguide portions 310A and 310B are on the input side of the coupler and the unequal width waveguide portions 310C and 310D are on the output side. Because of this difference, the phase difference between the output signal 422 and the output signal 424 is a constant π/2 regardless of manufacturing variation (e.g., variation in thickness). As long as the symmetry is maintained (e.g., with an equal width of the output waveguide portions 410C and 410D), the phase difference will be equal to π/2 due to the conversation of energy property in the unitary scattering matrix.

Figure 5:
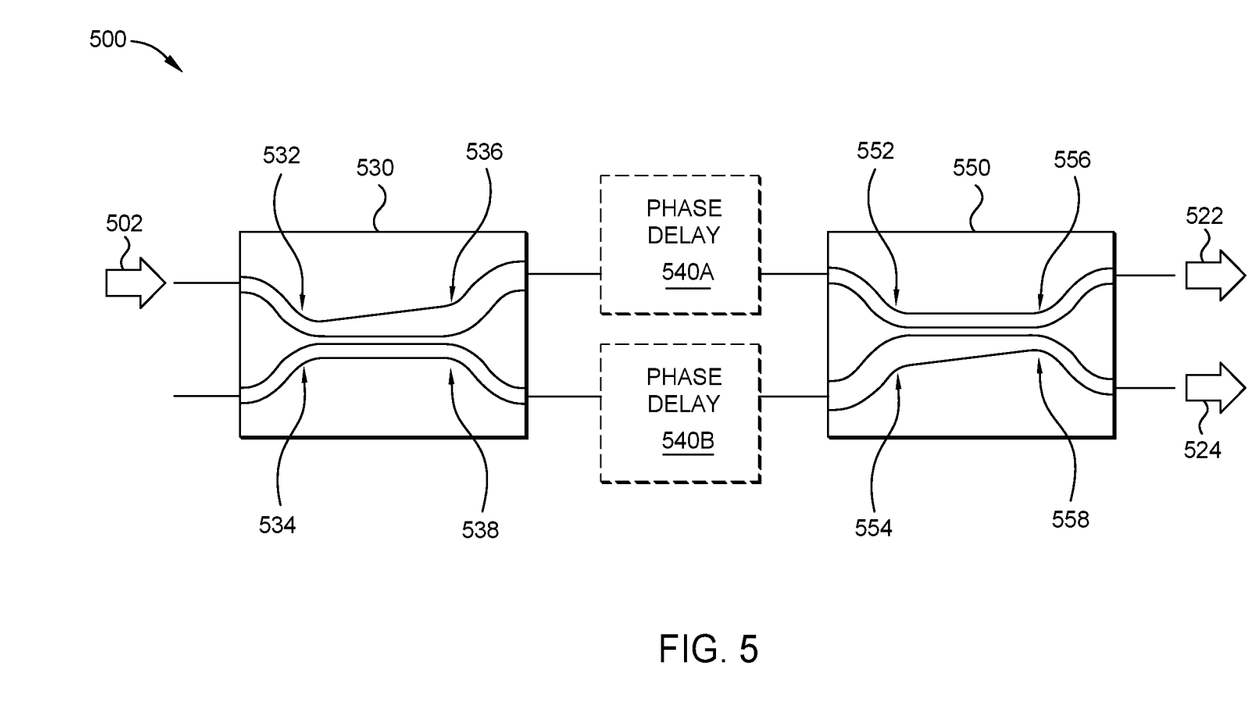
FIG. 5 illustrates a tap coupler device, according to one embodiment described herein.

FIG. 5 illustrates a tap coupler device 500, according to one embodiment described herein. As discussed above, the adiabatic coupler 400 illustrated in FIG. 4 is generally robust to manufacturing variation in both bandwidth and phase difference. But it is a 50/50 coupler, meaning that it divides the power of the input signal evenly between two outputs. The tap coupler device 500 illustrated in FIG. 5 is robust to manufacturing variation in both bandwidth and phase difference, and is also capable of dividing input signal power in any desired manner between outputs.

In an embodiment, the tap coupler device 500 is configured to receive an input signal 502 and to couple that signal to output signals 522 and 524. The tap coupler device 500 includes two adiabatic couplers 530 and 550, and phase delays 540A-B. For example, the adiabatic coupler 530 that receives the input signal 502 can be the adiabatic coupler 300 illustrated in FIG. 3, while the adiabatic coupler 550 that outputs the output signals 522 and 524 can be the adiabatic coupler 400 illustrated in FIG. 4. As discussed above with regard to FIG. 1C, the phase delays 540A-B can be any suitable phase shifter (e.g., a phase shifter suitable for use with known MZI based tap couplers).

The adiabatic coupler 530, on the input side of the tap coupler device 500, includes four waveguide portions 532, 534, 536, and 538. The input side waveguide portions 532 and 534 are approximately equal width, while the output side waveguide portions have different widths relative to each other. The adiabatic coupler 550, on the output side of the tap coupler device 500, includes four waveguide portions 552, 554, 556, and 558. The input side waveguide portions 552 and 554 have different widths relative to each other. As illustrated in FIG. 5, the input waveguide portion 552 is wider than the input waveguide portion 554. The output side waveguide portions 556 and 558 have approximately the same width relative to each other.

In an embodiment, the tap coupler device 500 includes only one phase delay (e.g., either the phase delay 540A or the phase delay 540B). For example, the tap coupler device 500 can include only the phase delay 540A. In this embodiment, the input side waveguide portion 552 of the adiabatic coupler 550 is optically coupled to the output side waveguide portion 536 of the adiabatic coupler 530, through the phase delay 540A. The input side waveguide portion 554 of the adiabatic coupler 550 is optically coupled directly to the output side waveguide portion 538 of the adiabatic coupler 530. Alternatively, as discussed above, the tap coupler device 500 can include both phase delays 540A-B and the input side waveguide portion 554 of the adiabatic coupler 550 can be optically coupled to the output side waveguide portion 538 of the adiabatic coupler 530 through the phase delay 540B.

In an embodiment, the tap coupler device 500 is robust to manufacturing variation in terms of bandwidth, because it uses the adiabatic couplers 530 and 550. As discussed above in relation to FIGS. 3 and 4, these adiabatic couplers are generally robust to manufacturing variation in terms of bandwidth. Further, the configuration of tap coupler device 500 (e.g., the use of the two adiabatic couplers 530 and 550 with the phase delays 540A-B) allows for any desired division of the power of the input signal 502 between the output signals 522 and 524. That is, unlike the adiabatic coupler 300 illustrated in FIG. 3 and the adiabatic coupler 400 illustrated in FIG. 4, the power of the input signal 502 can be divided in any way desired, not just 50/50 between the output signals.

Further, because the waveguide portions 556 and 558 (i.e., the final waveguide portions on the output side of the adiabatic coupler 550) have approximately equal width relative to each other, the phase difference between the output signals 522 and 524 is robust to manufacturing variation and is generally constant at π/2. Thus, the tap coupler device 500 is robust to manufacturing variation in terms of both bandwidth and phase difference between output signals, while allowing for any desired division of output signals.

In particular, the phase difference between the output signals 522 and 524 is generally robust to variation in the silicon thickness when manufacturing the tap coupler device 500 and forming its components. This is particularly beneficial because manufacturing variation in silicon thickness can otherwise be difficult to cure. Some manufacturing process variations can be corrected using known processes, like Optical Proximity Correction (OPC). For example, width and gap variations in devices created during manufacturing can typically be corrected by OPC. But variations in the silicon thickness from forming the tap coupler device 500 (e.g., from forming the adiabatic couplers 530 and 550) can generally not be cured by OPC. The tap coupler device 500 alleviates this problem because these manufacturing variations in silicon thickness do not affect the phase difference in the output signals.

Instead, the design of the tap coupler device 500 ensures that the phase difference between output signals 522 and 524 remains $\pi/2$, despite variations in the silicon thickness of the manufactured adiabatic couplers. In an embodiment, this is because output side waveguide portions 556 and 558 are approximately the same width relative to each other. In an embodiment, the width margin can depend on the design requirements for a particular tap coupler device (e.g., the budget, design requirements, specifications, etc.). This design keeps the phase difference between the output signals 522 and 524 at $\pi/2$.

Further, just as this design makes the tap coupler device 500 less sensitive to manufacturing variations in silicon thickness, the design also makes the tap coupler device 500 less sensitive to width and gap variations from manufacturing. While these variations may be corrected using OPC and other known processes, as discussed above, the tap coupler device 500 allows for improved manufacturing (e.g., cheaper and faster) because it mitigates the need for correction using OPC.

The designs illustrated in FIG. 5, and related embodiments (e.g., FIGS. 6 and 7 below) are fully passive in terms of phase difference between output signals. In some known devices, active tuning is used to modify the phase difference between output signals in case of manufacturing variation. In the tap coupler device 500, the phase difference between the output signals 522 and 524 is constant at $\pi/2$ and no active tuning is required. This further saves power and results in an improved product that is cheaper and easier to configure.

Figure 6:
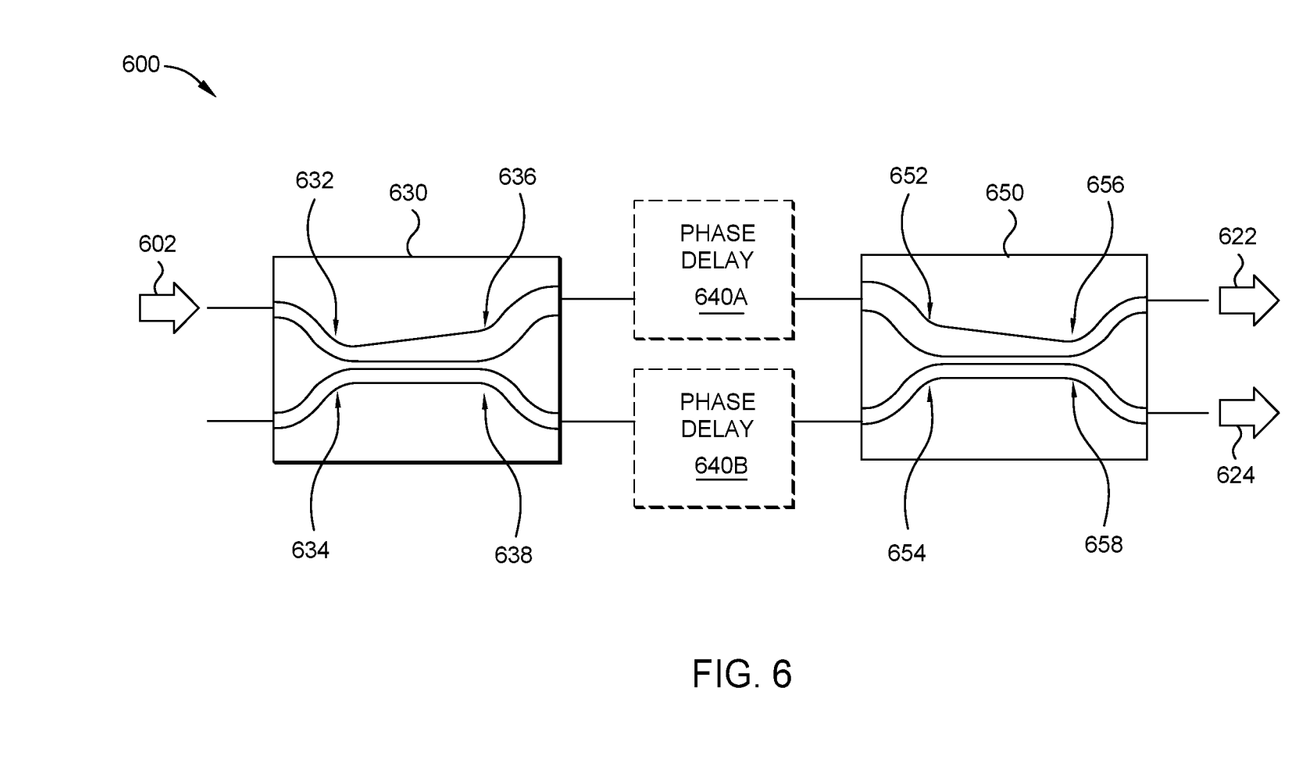
FIG. 6 illustrates a further tap coupler device, according to one embodiment described herein.

FIG. 6 illustrates a further tap coupler device 600, according to one embodiment described herein. In an embodiment, the tap coupler device 600 is similar to the tap coupler device 500 illustrated in FIG. 5 in some ways. For example, the tap coupler device 600 includes two adiabatic couplers, 630 and 650, and phase delays 640A-B. Further, the input side waveguide portions 652 and 654, in the adiabatic coupler 650, have different widths relative to each other (e.g., similar to the input side waveguide portions 552 and 554 illustrated in FIG. 5).

In the adiabatic coupler 650, however, the waveguide portion 652, coupled to the phase delay 640A, is wider than the waveguide portion 654. In the adiabatic coupler 550 illustrated in FIG. 5, the input side waveguide portion 552, coupled to the phase delay 540A, is narrower than the waveguide portion 554. This variation preserves the advantages of the tap coupler device 600 (e.g., robustness to manufacturing variation and uneven division of signal power), but allows for improved performance in certain applications.

In an embodiment, the tap coupler device 600 includes only one phase delay (e.g., either the phase delay 640A or the phase delay 640B). For example, the tap coupler device 600 can include only the phase delay 640A. In this embodiment, the input side waveguide portion 652 of the adiabatic coupler 650 is optically coupled to the output side waveguide portion 636 of the adiabatic coupler 630, through the phase delay 640A. The input side waveguide portion 654 of the adiabatic coupler 650 is optically coupled directly to the output side waveguide portion 638 of the adiabatic coupler 630. Alternatively, as discussed above, the tap coupler device 600 can include both phase delays 640A-B and the input side waveguide portion 654 of the adiabatic coupler 650 can be optically coupled to the output side waveguide portion 638 of the adiabatic coupler 630 through the phase delay 640B.

A person of ordinary skill in the art can select between the tap coupler device 500 and the tap coupler device 600, depending on the desired application. In an embodiment, the choice between the tap coupler device 500 and the tap coupler device 600 can depend on the implementation of width transition design and phase delay design. For example, in the tap coupler device 500, width transition may be required between 536 and 552, and between 538 and 554, due to the width mismatch. In tap coupler device 600, width transition is not required due to the equal width between 636 and 652, and between 638 and 654. However, in the tap coupler device 600, the phase delay design may need to compensate for a phase difference induced by the mismatch of waveguide width between the upper arm (wider waveguides 636/652) and the lower arm (narrower waveguides 638/654).

As discussed above, the tap coupler device 600 includes two adiabatic couplers 630 and 650, and phase delays 640A-B. The adiabatic coupler 650 is oriented so that waveguide portions having the same width, relative to each other, are on the output side of the tap coupler device 600. For example, the adiabatic coupler 630 includes four waveguide portions 632, 634, 636, and 638. The input side waveguide portions 632 and 634 have an approximately equal width, relative to each other, while the output side waveguide portions have different widths, relative to each other. The adiabatic coupler 650 also includes four waveguide portions 652, 654, 656, and 658. The input side waveguide portions 652 and 654 have different widths, relative to each other, while the output side waveguide portions 656 and 658 have approximately the same width, relative to each other.

An input signal 602 passes through the first adiabatic coupler 630. The input signal 602 then passes through one (or both) of the phase delays 640A-B. As discussed above with regard to FIG. 1C, the phase delays 640A-B can be any suitable phase shifter (e.g., a phase shifter suitable for use with a known MZI based tap coupler). The input signal then passes through the adiabatic coupler 650, generating two output signals 622 and 624.

Like the tap coupler device 500 illustrated in FIG. 5, the tap coupler device 600 allows for any desired division of power between the output signals 622 and 624. That is, the power of the input signal 602 can be divided in any way desired, not just 50/50 between the output signals. Further, again like the tap coupler device 500 illustrated in FIG. 5, because the waveguide portions 656 and 658 (i.e., the final waveguide portions on the output side of the adiabatic coupler 650) have approximately equal width, the phase difference between the output signals 622 and 624 is $\pi/2$.

As discussed above with regard to FIG. 5, for the tap coupler device 600 the output phase difference between the output signals 622 and 624 does not depend on manufacturing process variations in the adiabatic couplers 630 and 650. For example, the silicon thickness in the adiabatic couplers 630 and 650 may vary across different manufactured devices without any significant difference in the respective phase differences. The design of the tap coupler device 600 ensures that the phase difference between output signals 622 and 624 remains $\pi/2$, despite variations in the silicon thickness of the manufactured adiabatic couplers.

In various embodiments, the tap coupler device 500 illustrated in FIG. 5 and the tap coupler device 600 illustrated in FIG. 6 are operable across a number of communication bands. For example, these tap coupler designs are generally operable in either the C-band or the O-band. As is known to a person of ordinary skill, however, variations in material and parameters may make a particular tap coupler more suitable for one communication band or another. For example, the tap coupler device 500 may be more suitable for one communication band, while the tap coupler device 600 may be more suitable for a different communication band.

FIG. 7 illustrates a top down view of a structure for a tap coupler device 700, according to one embodiment described herein. In an embodiment, the tap coupler device 700 illustrates additional details about the tap coupler device 600 illustrated in FIG. 6. Like the tap coupler device 600, the tap coupler device 700 is generally robust to manufacturing variation in terms of both bandwidth and phase difference, and allows for any desired division of output signals.

In an embodiment, the tap coupler device 700 may use two core optical guiding materials: Silicon (Si) and Silicon Oxynitride (SiON). Regardless of the core optical guiding material, oxide may be used as a cladding material. While the illustrated Figure is discussed in terms of these materials, other suitable materials can also be used instead of, or in addition to, Si an SiON. For example, Silicon Nitride ($Si_3N_4$) could be used in place of, or in addition to, SiON and Si.

Si is commonly used as an optical guiding/routing material in the integrated optics industry. In general, Si allows for relatively seamless integration, and compatibility, for most platforms. Compared with Si, SiON typically has weaker optical refinement and is less sensitive to the wave-guiding geometry. Therefore, SiON is more robust to manufacturing process variation induced geometry changes (e.g., to width, gap, height, etc.). Further, the refractive index of SiON is generally insensitive to temperature. This allows high tolerance in temperature variation in the transceiver module, and does not require active tuning to balance the temperature variation. This conserves power and helps reduce the power budget for devices incorporating SiON.

Si and SiON can each be particularly suitable for different applications. Taking the configurations illustrated in FIGS. 5 and 6 as examples, for some applications it is preferable to use SiON for both phase delay (e.g., phase delays 540A-B and 640A-B) and the adiabatic couplers (e.g., the adiabatic couplers 530, 550, 630, and 650). This facilitates an all passive device (e.g., that does not include any active tuning components), that has a high tolerance to temperature variation and is robust to process variation.

For other applications, it is preferable to use Si. Taking the configurations illustrated in FIGS. 5 and 6 as examples, again, Si can be used for both phase delay (e.g., phase delays 540A-B and 640A-B) and the adiabatic couplers (e.g., the adiabatic couplers 530, 550, 630, and 650). This allows for relatively easy and effective turning of the device, with a trade-off in tolerance to temperature variation and robustness to manufacturing variation. This is a good alternative for some applications.

Finally, for other applications, it is preferable to use a combination of SiON and Si. For example, again referring to FIGS. 5 and 6, SiON could be used in the adiabatic couplers (e.g., the adiabatic couplers 530, 550, 630, and 650) and Si can be used in the phase delay (e.g., phase delays 540A-B and 640A-B). This combination configuration generally balances the benefits of both materials, and is a good solution for most applications. Further, as discussed above, other materials could be used. For example, $Si_3N_4$ could be used in place of, or in addition to, SiON and Si.

FIG. 7 illustrates one embodiment of a combination SiON and Si configuration. As discussed above, in an embodiment, the tap coupler device 700 provides one example structure for the tap coupler illustrated in FIG. 6. This is merely one example, however, and other structures can be used, for the tap coupler device 600 illustrated in FIG. 6 and the other tap couplers illustrated in FIGS. 1-5 (e.g., the tap coupler device 500 illustrated in FIG. 5).

The tap coupler device 700 includes two adiabatic couplers 730 and 750 (e.g., corresponding to the adiabatic couplers 630 and 650 illustrated in FIG. 6). The tap coupler device 700 further includes a phase delay 740 (e.g., corresponding to the phase delays 640A-B illustrated in FIG. 6). The adiabatic couplers 730 and 750 are coupled to the phase delay 740 using bending components B1 and B2 and taper components T1, T2, and T3.

The tap coupler device 700 further includes an upper arm 710 and a lower arm 720. The upper arm 710 optically couples the adiabatic coupler 730 to the phase delay 740, and the phase delay 740 to the adiabatic coupler 750. The lower arm 720 optically couples the adiabatic coupler 730 to the adiabatic coupler 750. In an embodiment, the same set of tapers are used in the upper arm 710 and the lower arm 720. That is, as illustrated in FIG. 7, tapers T1 and T3 are used both in the upper arm 710 and the lower arm 720, but in reverse order (e.g., the taper T3 is on the input side in the upper arm while the taper T1 is on the input side in the lower arm). These tapers include approximately equal dimensions.

In an embodiment, the phase delay 740 is implemented using two waveguides. The upper arm 710 includes a waveguide with a width $W_1$. The lower arm 720 includes a waveguide with a width $W_2$. As illustrated in FIG. 7, the waveguides in the upper arm 710 and the lower arm 720 have the same length: L. In an embodiment, the widths at the points where the bends B1 and B2 meet the tapers T1 and T3 can vary. These are labeled as $W_A$ and $W_B$.

As discussed above, in an embodiment the adiabatic couplers 730 and 750 can use Si, SiON, or any other suitable material as the core optical guiding material. Similarly, the phase delay 740 can include Si, SiON, or any other suitable material as the core optical guiding material. In one embodiment, the phase delay 740 uses Si as the core optical guiding material while the adiabatic couplers 730 and 750 use SiON as the core optical guiding material. As discussed above, this configuration provides for a balance of benefits between the materials and is suitable for many applications.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical device, comprising:
   a phase delay, comprising:
      a first arm comprising a first phase-delay waveguide, the phase-delay waveguide comprising a first phase-delay width and a first phase-delay length; and
      a second arm comprising a second phase-delay waveguide, the second phase-delay waveguide comprising a second phase-delay width different from the first phase-delay width and a second phase-delay length approximately equal to the first phase-delay length;
   a first adiabatic coupler adapted to receive an input signal and adapted to be optically coupled to an input of the phase delay; and
   a second adiabatic coupler adapted to be optically coupled to an output of the phase delay, the second adiabatic coupler comprising:
      a first output and a second output;
      a first waveguide comprising a first portion optically coupled to the first output and comprising a first width, and a second waveguide comprising a second portion optically coupled to the second output and comprising a second width that is approximately equal to the first width.

2. The optical device of claim 1, wherein the second adiabatic coupler is configured to produce a first output signal using the first output and a second output signal using the second output, with a relative phase difference between the first output signal and the second output signal of pi/2.

3. The optical device of claim 2, wherein the adiabatic coupler is configured to divide an input signal to the optical device in an uneven power distribution between the first output signal and the second output signal.

4. The optical device of claim 1, wherein the second width is equal to the first width.

5. The optical device of claim 1, wherein:
the first waveguide further comprises a third portion adapted to be optically coupled to the output of the phase delay and comprising a third width, and
the second waveguide further comprises a fourth portion adapted to be optically coupled to the first adiabatic coupler and comprising a fourth width.

6. The optical device of claim 5, wherein the third width is not equal to the fourth width.

7. The optical device of claim 6, wherein the third width is less than the fourth width.

8. The optical device of claim 1, wherein the first and second adiabatic couplers comprise at least one of Silicon Oxynitride (SiON) and Silicon Nitride ($Si_3N_4$) as a first optical guiding material and wherein the phase delay comprises Silicon (Si) as a second optical guiding material.

9. The optical device of claim 1, wherein the phase delay comprises Si as an optical guiding material.

10. The optical device of claim 1, wherein the first arm comprises first and second taper components, the second arm comprises third and fourth taper components, the third taper component comprises dimensions approximately equal to the first taper component, and the fourth taper component comprises dimensions approximately equal to the second taper component.

11. An adiabatic coupler, comprising:
a first output and a second output;
a first waveguide comprising a first portion optically coupled to the first output and a second portion adapted to be optically coupled to a phase delay; and
a second waveguide comprising a third portion optically coupled to the second output and a fourth portion adapted to be optically coupled to an output of another adiabatic coupler, wherein the first portion comprises a first width and the third portion comprises a second width approximately equal to the first width,
wherein the adiabatic coupler is included in an optical communication device,
wherein the adiabatic coupler is configured to produce a first output signal using the first output and a second output signal using the second output, with a relative phase difference between the first output signal and the second output signal of pi/2, and wherein the adiabatic coupler is configured to divide an input signal to the optical communication device in an uneven power distribution between the first output signal and the second output signal.

12. The adiabatic coupler of claim 11, wherein:
the second portion adapted to be optically coupled to the phase delay comprises a third width;
the fourth portion adapted to be optically coupled to the output of the other adiabatic coupler comprises a fourth width; and
the third width is not equal to the fourth width.

13. The adiabatic coupler of claim 11, further comprising:
Silicon Oxynitride (SiON) as a first optical guiding material, wherein the phase delay comprises Silicon (Si) as a second optical guiding material.

14. The adiabatic coupler of claim 11, wherein the phase delay comprises:
a first arm comprising a third waveguide, the third waveguide comprising a third width and a first length; and
a second arm comprising a fourth waveguide, the fourth waveguide comprising a fourth width different from the third width and a second length approximately equal to the second length.

15. A fiber optic communication system, comprising:
a data source;
a multiplexer;
a demultiplexer; and
a tap coupler comprising:
a passive phase delay;
a first adiabatic coupler adapted to receive an input signal and adapted to be optically coupled to an input of the passive phase delay; and
a second adiabatic coupler adapted to be optically coupled to an output of the passive phase delay, the second adiabatic coupler comprising:
a first output and a second output;
a first waveguide comprising a first portion optically coupled to the first output and comprising a first width, and
a second waveguide comprising a second portion optically coupled to the second output and comprising a second width that is approximately equal to the first width.

16. The fiber optic communication system of claim 15, wherein the second adiabatic coupler is configured to produce a first output signal using the first output and a second output signal using the second output, with a relative phase difference between the first output signal and the second output signal of pi/2, and
wherein the first output signal and the second output signal comprise differing power distributions of the input signal.

17. The fiber optic communication system of claim 15, wherein the first and second adiabatic couplers comprise Silicon Oxynitride (SiON) as a first optical guiding material and wherein the passive phase delay comprises Silicon (Si) as a second optical guiding material.

* * * * *